L. A. SANDOE.
CHURN DASHER.
APPLICATION FILED OCT. 20, 1910.
978,653.
Patented Dec. 13, 1910.
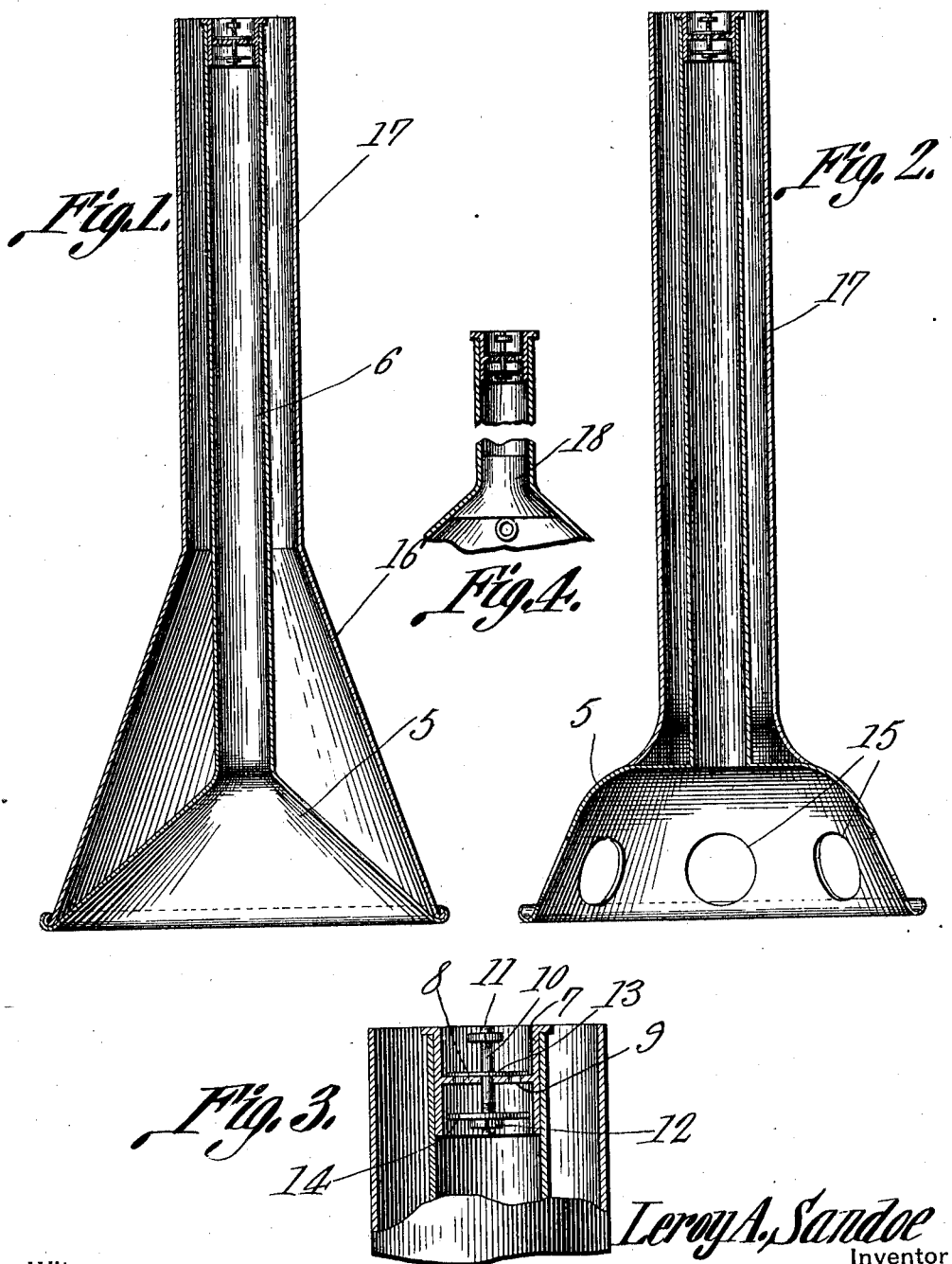

UNITED STATES PATENT OFFICE.

LEROY A. SANDOE, OF HOPE, ARKANSAS.

CHURN-DASHER.

978,653.   Specification of Letters Patent.   Patented Dec. 13, 1910.

Application filed October 20, 1910. Serial No. 588,149.

*To all whom it may concern:*

Be it known that I, LEROY A. SANDOE, a citizen of the United States, residing at Hope, in the county of Hempstead and State of Arkansas, have invented a new and useful Churn-Dasher, of which the following is a specification.

The present invention aims to provide an improved construction of churn dasher and the improvements are directed, more particularly, to a dasher of the hand type.

One object of the invention is to provide a dasher having a water space into which water may be introduced for the purpose of raising or lowering the temperature of the milk being churned.

At the present time, it is customary to set the container for the milk to be churned, in a pan or like receptacle containing water at the temperature to which the milk is to be brought, but this method is slow and undesirable principally for the reason that the wall of the receptacle containing the milk must be warmed or cooled before the milk itself is subjected to any change in temperature.

The present invention therefore aims to provide a churn dasher embodying means for raising or lowering the temperature of the milk to be churned, quickly, and effectively.

With the above and other objects in view, the invention resides in the general construction and arrangement of parts hereinafter described and claimed and illustrated in the accompanying drawings in which,—

Figure 1 is a vertical sectional view through one form of churn dasher embodying the present invention. Fig. 2 is a similar view illustrating another form of dasher, and Fig. 3 is a detail vertical section through the upper end of the dasher handle and air tube showing the valve of the dasher in detail. Fig. 4 is a vertical sectional view illustrating a modified form of handle for the dasher.

In the drawings, the dasher is illustrated as embodying a hollow body 5 which may be conical as shown in Fig. 1 or of the form shown in Fig. 2, or it may assume some other form. Leading upwardly from the body 5 is an air tube which is indicated by the numeral 6. In the upper end of this tube is fitted a valve embodying the present invention. The valve above mentioned includes, in its structure, a cylindrical body indicated by the numeral 7 and having, between its upper and lower ends, a perforated diaphragm 8, the perforations in the diaphragm being indicated by the numeral 9. A stem 10 is permanently secured axially through the diaphragm 8 and projects above and below the said diaphragm and the upper and lower ends of said stem are threaded as at 11, and nuts 12 are fitted thereon. Loosely mounted upon the stem 10 above the diaphragm 8 is a valve disk which is indicated by the numeral 13, and a valve disk 14 is loosely mounted upon the stem below the diaphragm 8. The disk 13 and disk 14, as stated, are loose upon the respective portions of the stem but they are limited in their movement by the diaphragm 8 and the nuts 11 upon the respective ends of the stem. At this point it will be readily understood that when the valve disk 13 is resting flat upon the diaphragm 8, the passage of air downwardly through the air tube will be prevented and that, similarly, when the disk 14 is flat against the under side of the diaphragm, the passage of air upwardly through the tube will be prevented. Consequently when it is desired to force air into the milk while operating the dasher therein, the valve disk 13 is removed and the valve disk 14 performs its function. On the other hand, when it is desired to create a suction force on the up stroke of the dasher, the valve disk 14 is removed and the disk 13 is left in place. Thus, the valve here shown may be readily converted from a suction into a compression valve or vice versa.

In the form of the invention shown in Fig. 1 of the drawings, the wall of the body 5 of the dasher is imperforate, but in the form shown in Fig. 2, openings indicated by the numeral 15, are formed in the said wall and in using the form of dasher shown in Fig. 2, the milk will rush back and forth through the openings 15 as the dasher is moved up and down in the milk.

As heretofore stated, one object of the invention is to provide a water space in connection with a dasher of this type and in the form of the invention shown in Fig. 1 of the drawings, this water space is between the wall of a hollow conical body 16 and the wall of the body 5 and lower portion of the air tube 6 of the dasher, the said body 5 and the said lower portion of the air tube being completely surrounded and inclosed by the wall of the body 16. The body 16 includes a tubular extension 17 which incloses the upper portion of the air tube 6 and affords, in conjunction with said air tube, an additional water space. In the form of the invention shown in Fig. 2 of the drawings, the body 16 is omitted but the tubular member 17 incloses the entire length of the air tube 6. In either instance, in using the dasher, water is introduced into the water space, the water being at the temperature to which it is desired to bring the milk during the churning operation and the dasher is then immersed in the milk and allowed to stand therein for a few moments until the milk has been brought to the desired temperature. It is then removed from the milk and inverted so as to discharge the water and after the water has been emptied therefrom it is employed in the same manner as are all dashers of this type.

In the form of the invention shown in Fig. 4 of the drawings, the handle portion of the dasher embodies but a single tubular member and there is provided, in connection with the said handle, a plug 18 which may be removably fitted in the lower end of the handle and this end in this manner closed. Water may then be poured into the handle and the temperature of the milk may be raised or lowered as desired. When the handle is being filled with water, the valve at the upper end of the handle is of course removed and after the milk has been brought to the proper temperature, the dasher is removed from the milk, the plug 18 withdrawn, and the valve replaced at the said upper end of the handle after which the device is used as heretofore described.

What is claimed is:—

1. A churn dasher including a hollow body, an air tube leading therefrom, and a valve in said tube embodying a plurality of valve disks selectively removable.

2. A churn dasher having a hollow body, and a handle thereon, and a water jacket surrounding the body and handle.

3. A churn dasher including a hollow body, an air tube leading therefrom, and a valve in said tube comprising a foraminous diaphragm, a fixed stem projecting above and below the diaphragm, and valve disks loosely mounted upon the stem one above and the other below the diaphragm, said valve disks being selectively removable.

In testimony that I claim the foregoing as my own, I have hereto affixed my signature in the presence of two witnesses.

LEROY A. SANDOE.

Witnesses:
W. E. BRIANT,
W. M. CAUTLEY.